June 3, 1969 T. G. HARRIGAN 3,448,370
HIGH FREQUENCY POWER INVERTER
Filed Aug. 11, 1967
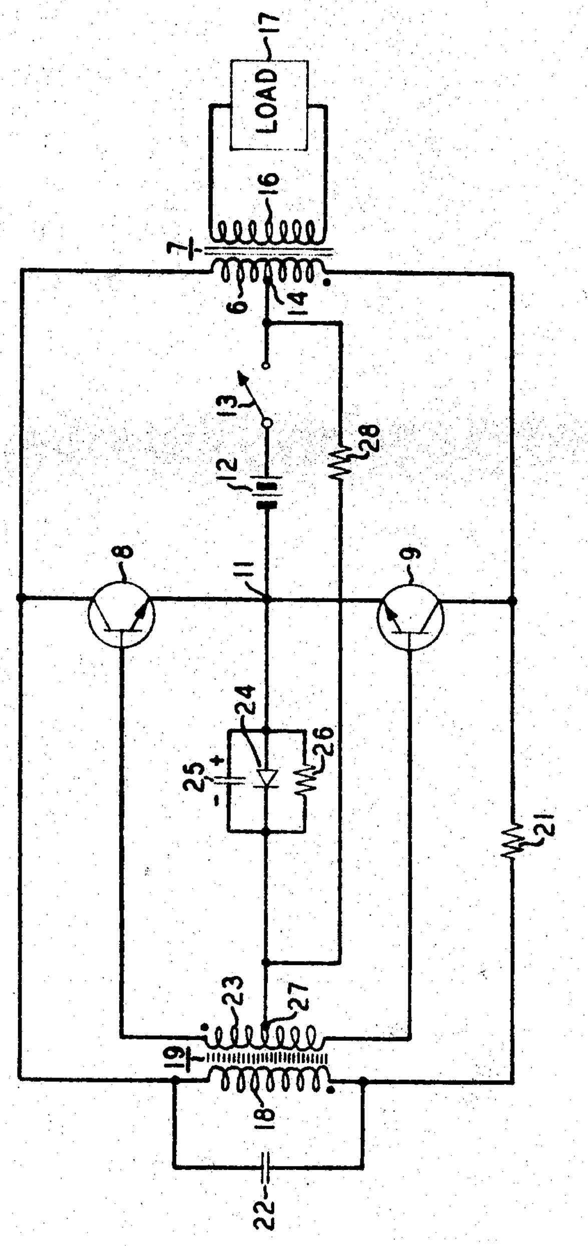
INVENTOR
T. G. HARRIGAN
BY John P. McDonnell
ATTORNEY United States Patent Office 3,448,370

Patented June 3, 1969

3,448,370

HIGH FREQUENCY POWER INVERTER

Thomas G. Harrigan, Lake Hiawatha, N.J., assignor to Bell Telephone Laboratories Incorporated, Murray Hill, N.J., a corporation of New York Filed Aug. 11, 1967, Ser. No. 660,098
Int. Cl. H02m 7/52
U.S. Cl. 321—45 5 Claims

ABSTRACT OF THE DISCLOSURE

Conduction overlap is eliminated and high frequency efficiency improved in a push-pull power inverter with the inclusion of a capacitor in a circuit common to the base-emitter paths of both transistors.

*Background of the invention*

This invention relates to the field of power inverters and DC to DC converters.

Since the advent of the transistor, the static power inverter has become an extremely useful component for changing direct current into a waveform which may easily be stepped up or down in voltage. Considerable improvement in cost, reliability, weight and efficiency of inverters has evolved so that at the present state of the art, a great variety of electronic equipment may be operated from portable or standby batteries. A substantial further improvement in any one of these factors, however, will not only improve the performance of available equipment, but will make practical and hence available additional equipment which is now marginal.

Since the cost and the weight of the output filter of a DC to DC converter is very dependent upon the operating frequency, a higher frequency requiring less expensive and lighter filtering apparatus, it is desirable to set the operating frequency as high as possible. Because of the irritating effect high frequency audio squeals have on human beings, it is particularly desirable to set the frequency above the audio range. The typical push-pull inverter circuit, however, such as those described by J. L. Jensen in "An Improved Square-Wave Oscillator Circuit," IRE Transactions on Circuit Theory, September 1957, is limited to frequencies well within man's hearing range. During commutation, while one transistor is in the process of turning OFF and the other is turning ON, there is a period of time during which both transistors are conducting. The power consumed during the conduction overlap period is wasted, for the flux generated in half of the output tranformer is canceled by that generated in the other half. Furthermore, since the voltage across the transistor that is turning on is high, the power loss is high, and most of it is absorbed by that transistor. As the operating frequency is increased, the productive part of each cycle is shortened, but the current overlap part is not. At higher frequencies, therefore, the well known inverter circuits tend to become very inefficient and hard on the transistors, and hence impractical.

An object of this invention is to prevent conduction overlap in a push-pull inverter.

Another object is to provide an efficient inverter that operates at frequencies higher than the audio range.

A further object is to stabilize the operating frequency of an inverter.

*Summary of the invention*

In a push-pull power inverter a capacitor is serially connected in a circuit common to the biasing paths of both transistors to prevent the simultaneous conduction of the transistors. The capacitor charges during the conduction period of each transistor, then acts as a low impedance source to speed up the turn-off of the conducting transistor and at the same time to prevent the nonconducting transistor from turning on prematurely. A diode may be used across the capacitor to clamp its voltage and a resistor to fix its discharge time constant.

*Brief description of the drawing*

The drawing is a schematic diagram of a common emitter inverter constructed according to the principles of the invention.

*Detailed description*

In the circuit of the drawing, the primary winding 6 of an output transformer 7 is connected between the collectors of transistors 8 and 9. The emitters of transistors 8 and 9 are connected together at a point 11. A series circuit, including a uni-directional potential source such as battery 12 and a single-pole, single-throw switch 13, is connected between point 11 and a center tap 14 on primary winding 6. The secondary winding 16 of output transformer 7 is connected to a load 17 which may or may not include a rectifier and filter. The primary winding 18 of a saturable feedback transformer 19 is also connected between the collectors of transistors 8 and 9 through a feedback resistance 21. A capacitor 22 shunts winding 18. The secondary winding 23 of feedback transformer 19 is connected between the bases of transistors 8 and 9. A circuit including the parallel combination of a diode 24, a capacitor 25 and a resistor 26 is connected between point 11 and a center tap 27 on secondary winding 23. A starting resistor 28 connects center tap 14 with center tap 27.

With the exception of diode 24, capacitor 25, resistor 26 and capacitor 22, the illustrated circuit is the same as that shown in Jensen, id., FIG. 9, and operates as follows: When switch 13 is closed, current flows from battery 12 through switch 13 and starting resistor 28; it then divides and passes through both halves of winding 23, and the base-emitter junctions of transistors 8 and 9. This causes collector current to flow from battery 12 through switch 13 and to split through both halves of winding 6 and the collector-emitter junctions of the transistors back to battery 12. Since no two transistors are identical, if we assume that transistor 8 has a higher gain than transistor 9, it will draw more collector current, and the voltage developed across winding 6 will be positive at the dotted end. This same voltage, diminished by the drop across feedback resistor 21, appears across winding 18 positive at the dot end, inducing a voltage in winding 23 also positive at the dot. The induced voltage drives transistor 8 into saturation by the path which includes half of winding 23, the base-emitter junction of transistor 8, and diode 24. At the same time, transistor 9 is held fully OFF by the voltage induced in the other half of winding 23. While diode 24 is conducting, capacitor 25 charges to a potential equal to the diode forward voltage drop with a polarity as shown in the drawing. Now when the core of transformer 19 saturates, the voltage across winding 18 tends to drop toward zero, with feedback resistor 21 absorbing the voltage across winding 6, and the voltage induced in winding 23 drops to zero and starts to reverse. At this point, diode 24, capacitor 25, and capacitor 22 come into play. Without these elements, as soon as the driving voltage induced in winding 23 dropped due to core saturation, the current driven by battery 12 through starting resistor 28 would add to that driven by the charge stored in the base-emitter junction of transistor 8 to drive ON transistor 9 while transitsor 8 was still saturated. Since the voltage across each half of winding 6 is equal to the battery voltage minus the collector-emitter voltage across transistor 8, the collector-emitter voltage of transistor 9 is at this instant almost twice the battery voltage. The power dissipated in transistor 9 is, of course, equal to the product of its base current, $\beta$, and collector-emitter voltage. Consequently, the instantaneous power dissipated during the resulting current overlap period would be very high, greatly limiting efficient operating frequency as mentioned before.

In the circuit of the invention, however, as soon as transformer 19 saturates, capacitor 25 becomes a low impedance voltage source to sweep-out the charge carriers in the base-emitter junction of transistor 8, thereby greatly speeding up the rate at which that transistor turns OFF. At the same time, the voltage across capacitor 25 represents a negative bias to transistor 9, preventing it from turning ON. Once capacitor 25 is discharged, transistor 9 becomes conductive, and the direction of current in primary winding 6 reverses rapidly but smoothly. Smooth current reversal in the output transformer provides the added advantage of the elimination of high voltage spikes across the emitter-collector junctions of the transistors and across the load. Resistor 26 provides a further discharge path for capacitor 25 and largely determines the discharge time. Its value is chosen to just prevent current overlap.

Although a DC current path from common emitter point 11 to tap 27 is required, diode 24 is not absolutely necessary to the operation of the circuit; it has, however, three useful functions. During starting, it prevents the starting current through resistor 28 from returning to the battery without passing through a base-emitter junction. During operation it limits the voltage to which capacitor 25 is charged, thereby providing a uniform commutation time for reliable operation. Finally, since the series combination of one base-emitter junction and diode 24 is directly across each half of secondary winding 23, the feedback transformer voltage is very effectively clamped on each half cycle. The operating frequency of the inverter circuit is determined by the time it takes for the feedback transformer 19 to be driven from saturation in one direction to saturation in the other direction. With the clamping action, therefore, the number of volts per turn of the secondary winding is held essentially constant, and the operating frequency relatively constant for variations in line voltage and load. Temperature compensation may be added to this frequency regulation to off-set the decrease in semiconductor junction voltage drop with increasing temperature by the choice of a saturable core material whose saturation flux density varies inversely with temperature, such as supermalloy.

With diode 24 inserted to provide the necessary DC path, resistor 26 is, of course, not essential, but as previously mentioned, it is a convenient device for setting the capacitor 25 discharge time constant.

Capacitor 22 is likewise not entirely necessary to the operation of the invention. It, however, charges up to the voltage across winding 18 and prolongs the period during which transformer 19 remains saturated. This has the effect of providing additional time for transistor 8 to turn OFF and transistor 9 to turn ON.

It will be recognized that although only one common emitter circuit was shown for illustration, the invention is not limited thereto. Other circuit configurations, such as single transformer circiuts, where the output transfomer is saturable and the feedback biasing potential is derived from additional windings, can be devised by those skilled in the art without departing from the spirit or scope of the invention.

What is claimed is:

1. A push-pull power inverter circuit comprising at least two transistors, each having a biasing path and a transconductive path, an output transformer having a primary winding with a tap, said transconductive paths being serially connected in opposite polarity across said primary winding, a source of uni-directional potential connected between said tap and the junction of said transconductive paths, a source of biasing potential of opposite phase to the voltage across said primary winding connected to each biasing path, a capacitor serially connected in a circuit common to both of said biasing paths for preventing the simultaneous conduction of said transconductive paths, and a diode connected across said capacitor for clamping the voltage to which said capacitor charges.

2. A push-pull power inverter circuit as in claim 1 wherein the emitters of said transistors are connected together and to said source of uni-directional potential.

3. A push-pull power inverter circuit as in claim 1 wherein said source of biasing potential comprises a feedback transformer having a primary winding and a tapped secondary winding, said feedback transformer primary winding being connected in a path in parallel with said output transformer primary winding, said feedback transformer secondary winding being connected between said biasing paths, and said capacitor being connected between the tap on said feedback transformer secondary winding and said biasing paths.

4. In a push-pull power inverter circuit comprising at least two transistors, each having a biasing path and a transconductive path, an output transformer having a primary winding with a tap, said transconductive paths being serially connected in opposite polarity across said primary winding, a source of uni-directional potential connected between said tap and the junction of said transconductive paths, a feedback transformer having a primary winding connected in a path parallel with said output transformer primary winding and a tapped secondary winding connected between said biasing paths, and means including a capacitor serially connected in a circuit common to both of said biasing paths for preventing the simultaneous conduction of said transconductive paths, a capacitor connected across said feedback transformer primary winding.

5. A push-pull inverter circuit comprising at least two transistors, each having a biasing path and a transconductive path, an output transformer having a primary winding with a tap, said transconductive paths being serially connected in opposite polarity across said primary winding, a source of uni-directional potential connected between said tap and the junction of said transconductive paths, a source of biasing potential of opposite phase to the voltage across said primary winding connected to each biasing path, a capacitor serially connected in a circuit common to both of said biasing paths for preventing the simultaneous conduction of said transconductive paths, a diode connected across said capacitor for clamping the voltage to which said capacitor charges, and a resistor connected across said capacitor and diode for sending the discharge time of said capacitor.

References Cited

UNITED STATES PATENTS

| | | | |
|---|---|---|---|
| 2,931,986 | 4/1960 | Ensink et al. | |
| 2,964,676 | 12/1960 | Davies et al. | |
| 2,968,738 | 1/1961 | Pintell. | |
| 3,030,521 | 4/1962 | Lucke. | |
| 3,075,095 | 1/1963 | Stevens. | |
| 3,235,818 | 2/1966 | Meszaros et al. | 321—44 XR |
| 3,350,624 | 10/1967 | Annunziato et al. | 321—45 XR |
| 3,361,952 | 1/1968 | Bishop | 321—45 |

LEE T. HIX, *Primary Examiner.*

W. M. SHOOP, Jr., *Assistant Examiner.*

U.S. Cl. X.R.

331—113